(12) United States Patent
Walter et al.

(10) Patent No.: US 8,487,570 B2
(45) Date of Patent: Jul. 16, 2013

(54) METHOD AND DEVICE FOR OPERATING AN ELECTRIC DRIVE WITH THE AID OF A PHASE ANGLE CONTROL

(75) Inventors: Roland Walter, Tiefenbronn (DE);
Jacek Wiszniewski, Alberhausen (DE);
Michael Maercker, Stuttgart (DE);
Klaus Dengler, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 346 days.

(21) Appl. No.: 12/808,047

(22) PCT Filed: Oct. 15, 2008

(86) PCT No.: PCT/EP2008/063821
§ 371 (c)(1),
(2), (4) Date: Sep. 27, 2010

(87) PCT Pub. No.: WO2009/077221
PCT Pub. Date: Jun. 25, 2009

(65) Prior Publication Data
US 2011/0018477 A1      Jan. 27, 2011

(30) Foreign Application Priority Data

Dec. 14, 2007   (DE) .......................... 10 2004 060 242

(51) Int. Cl.
*H02P 6/14*            (2006.01)
(52) U.S. Cl.
USPC . 318/400.35; 318/812; 318/774; 318/400.26; 318/445; 318/400.33; 318/400.14; 327/451; 327/452; 327/453; 327/447; 327/446

(58) Field of Classification Search
USPC ............ 318/729, 810, 811, 774, 812, 400.35, 318/400.26, 445, 400.14, 400.33; 327/451, 327/452, 453, 447, 446; 323/235
See application file for complete search history.

(56) References Cited

U.S. PATENT DOCUMENTS

| 4,369,403 | A | * | 1/1983 | Lee ............................... 318/729 |
| 4,584,507 | A | * | 4/1986 | Taylor ........................... 388/813 |
| 5,075,613 | A | * | 12/1991 | Fisher ........................... 318/809 |
| 5,200,684 | A | * | 4/1993 | Fisher ........................... 318/809 |
| 6,346,790 | B1 | * | 2/2002 | Kemp et al. .................... 318/813 |
| 6,614,197 | B2 | * | 9/2003 | Berringer ....................... 318/245 |
| 6,684,866 | B2 | * | 2/2004 | Meinders et al. ............. 123/620 |
| 7,026,877 | B2 |  | 4/2006 | Yi |
| 7,446,493 | B2 | * | 11/2008 | Forster et al. ............ 318/400.35 |

FOREIGN PATENT DOCUMENTS

| DE | 43 44 557 | 7/1994 |
| EP | 1 398 871 | 3/2004 |
| EP | 1 806 836 | 7/2007 |

(Continued)

*Primary Examiner* — Rita Leykin
(74) *Attorney, Agent, or Firm* — Merchant & Gould P.C.

(57) ABSTRACT

The invention relates to a method for operating an electric motor (2) having a phase angle control with the following steps: Applying an AC voltage to a series connection of the electric motor (2) and a switching element (4), particularly a triac, wherein the switching element (4) connects through by applying an ignition signal and suppresses the flow of a current if the amount of current falls below a holding current; determining the time of a zero crossing of a virtual motor current that would flow if the switching element (4) were connected through; and turning on the switching element (4) at an activation time that is dependant on the time of the zero crossing of the virtual motor current.

9 Claims, 1 Drawing Sheet

FOREIGN PATENT DOCUMENTS

| | | |
|---|---|---|
| EP | 1 858 154 A2 | 11/2007 |
| KR | 10-2006-0047966 | 5/2006 |
| RU | 2 310 973 C1 | 11/2007 |
| SU | 1508333 A1 | 9/1989 |
| SU | 1734183 A1 | 5/1992 |

* cited by examiner

METHOD AND DEVICE FOR OPERATING AN ELECTRIC DRIVE WITH THE AID OF A PHASE ANGLE CONTROL

This application is a National Stage Application of PCT/EP2008/063821, filed 15 Oct. 2008, which claims benefit of Serial No. 10 2007 060 242.3, filed 14 Dec. 2007 in Germany and which applications are incorporated herein by reference. To the extent appropriate, a claim of priority is made to each of the above disclosed applications.

TECHNICAL FIELD

The present invention relates to the field of activations for electric machines with the aid of the so-called phase angle control.

STATE OF THE ART

In the case of the well known electric drives as, for example, electric motors with a commutator, a phase shift between the applied voltage and the motor current exists due to the operating principle. This phase shift is as a rule load dependent. The power output of electric motors of this type can normally be steplessly adjusted with the aid of a so-called phase angle control. Said phase angle control is a method for controlling the power output of an electric machine, which is operated with AC voltage. During the phase angle control, the motor current is activated in a delayed manner after the zero crossing of the supply AC voltage and remains turned on until the next zero crossing.

A phase angle control can be carried out with the aid of a triac. The triac conducts electrical current only upon receiving an ignition impulse and after being ignited up until said electrical current falls below a minimum current, the so-called holding current. An igniting of said triac at a time, at which the motor current determined by the phase shift lies below the holding current, leads to the triac failing to ignite. In this case, the electric motor is not activated during the current half-wave. The same thing occurs if a triac still conducting electrical current is ignited. This leads to disturbances during the operation of the electric motor as, for example, an increased noise level, an increased EMC radiation, power loss and the like.

In order to ensure that the triac is always ignited in a range, wherein a motor current can be expected, which lies above the holding current, the triac as a rule is first ignited after a defined minimum period of time after the zero crossing of the applied voltage. The defined minimum period of time is specified such that the igniting of the triac is ensured to occur when the current is sufficiently high. Because the phase shift between the applied voltage and the motor current is dependent on the load, said defined minimum period of time is determined from the phase shift, which corresponds to the largest phase shift occurring in the entire system, and from an additional safety time, which takes possible component fluctuations of the triac into consideration, e.g. switching times. In an operating state, wherein the phase shift between the applied voltage and the motor current is smaller than the maximum phase shift, a larger period of time consequently results, during which an ignition of the triac is prevented from igniting.

This leads to among other things an increased creation of harmonics, which lead to reduced service life times of the carbon brushes of the commutator on account of an increase in electrical arcing and to an increase in the interference emissions of the electric motor. A further heating of the motor additionally occurs as a result of an increased power loss.

It is the aim of the present invention to provide a method and a control device for operating an electric motor having a phase angle control, with which these disadvantages are avoided.

SUMMARY

This aim is met by the method for operating an electric motor according to claim 1 as well as by the control device for an electric motor according to the coordinate claim.

Additional advantageous configurations of the invention are stated in the dependent claims.

According to a first aspect, provision is made for a method for operating an electric motor having a phase angle control. The method comprises the following steps:

Applying an AC voltage to a series connection of the electric motor and a switching element, particularly a triac, wherein the switching element connects through by applying an ignition signal, i.e. becomes electrically conductive, and suppresses the flow of a current, i.e. becomes highly resistive, if the amount of current falls below a holding current;

Determining the time of a virtual zero crossing of a motor current that would flow if the switching element were connected through; and Turning on the switching element at an activation time that is dependent on the time of the virtual zero crossing of the motor current.

A concept of the method mentioned above consists of not specifying a fixed, definite minimum period of time before the igniting of the triac may occur after a zero crossing of the applied voltage at an electric motor. As a function of the time of the zero crossing that was determined, the earliest time in accordance with the operating state of the motor system can be ascertained, from which an igniting of the switching element can again be permitted. The virtual zero crossing of the motor current corresponds to the time of the zero crossing of a motor current when the switching element is permanently connected through (conductive).

The switching element can furthermore be activated at a time, which is dependent on a provided control variable that indicates the desired power output of the electric motor. In this way, the electric motor can be virtually steplessly activated.

The determination of the time of the virtual zero crossing of a motor current can be carried out as a function of the time of the deactivation of the switching element. The time of the deactivation of the switching element can particularly be determined as the time, at which a voltage jump of the voltage present across said switching element occurs. This constitutes an especially simple detection of the time of the zero crossing, at which no further current measurement is required.

According to one embodiment, the times when the voltage jump of the voltage present across the switching element occur can be determined to be the times when said voltage jump occurs, at which the switching element is not turned on.

The activation time can furthermore be determined by adding a length of time to the time of the zero crossing. In so doing, the length of time is defined or is, for example, selected as a function of the frequency of the applied AC voltage and/or as a function of the holding current of the switching element. The earliest activation time can thereby be simply defined.

According to a further aspect, a motor control unit for operating an electric motor having a phase angle control is provided, with which an AC voltage is applied to a series connection of the electric motor and a switching element, particularly a triac, and with which the switching element connects through by applying an ignition signal and suppresses the flow of a current if the amount of current falls below a holding current. The motor control unit comprises a detection unit for determining a time of a virtual zero crossing of a motor current that would flow if the switching element were connected through and a control device for turning on the switching element at a time that is dependent on the time of the virtual zero crossing of the motor current.

According to a further aspect, a motor system is provided having the motor control unit mentioned above, an electric motor and a switching element, wherein said electric motor and said switching element are connected to each other in series.

According to a further aspect, a computer program is provided that contains a program code, which executes the aforementioned method if it is executed on a data processing unit.

BRIEF DESCRIPTION OF THE DRAWINGS

Preferred embodiments of the invention are described in detail below with the help of the accompanying drawings. The following are shown.

DETAILED DESCRIPTION

Figure 1:
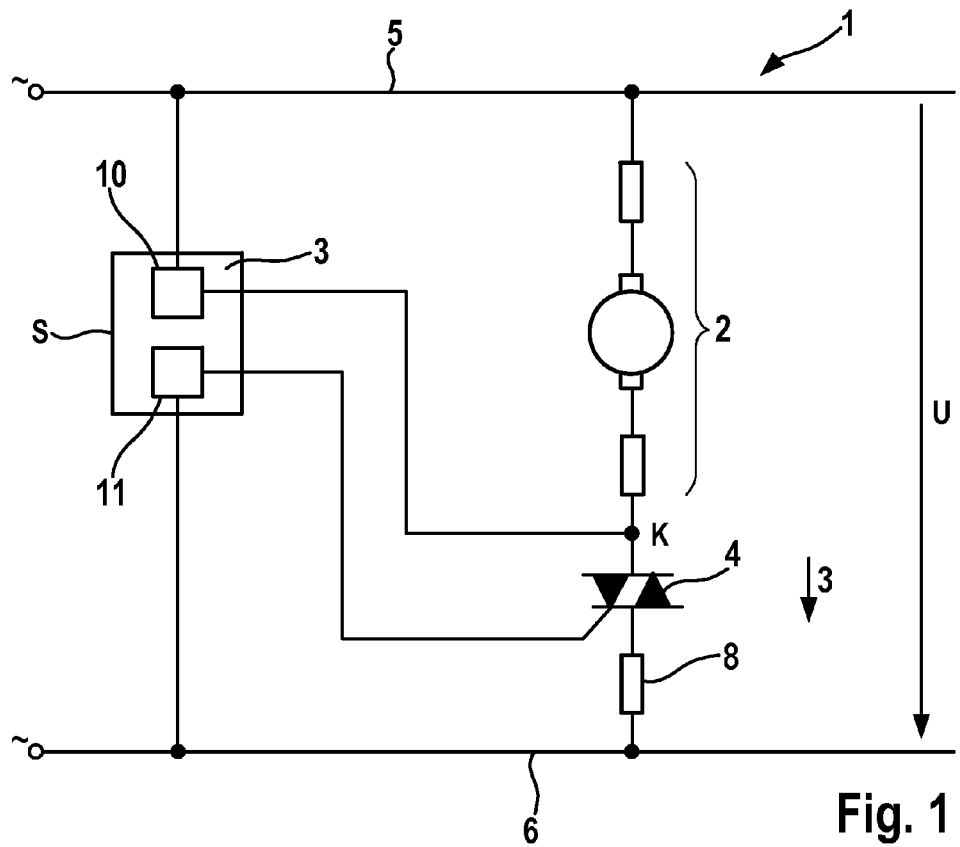
FIG. 1: a schematic depiction of a motor system having an electric motor, a triac and a control unit according to one embodiment of the invention.

A motor system 1 having an electric machine 2, a control unit 3 and a switching element 4 is depicted in FIG. 1. The electric machine 2 is provided in the form of an electric motor having a commutator. The electric motor 2 is to be activated with variable power output. For that purpose, said electric motor 2 is connected in series with the switching element 4 and a (optional) current limiting resistor 8 between a first and a second AC voltage line 5, 6.

The switching element 4 is preferably configured as a triac 4, which can assume non-conductive and conductive states. The triac 4 becomes conductive if a voltage impulse is applied at its control terminal and the amount of current flowing through it exceeds a specified threshold value. The amount of the smallest current through the triac 4, with which an ignition can occur, is called holding current. Depending on the current direction, a triac 4 of this type has a positive holding current for a positive current direction and a negative holding current for a negative current direction, which can be different.

The triac 4 is activated by the control unit 3 in order to implement a phase angle control. The phase angle control causes the motor current to flow only during a predetermined amount of time during a half-wave of the motor current without phase angle control. The predetermined amount of time is determined by a control variable S. Said control variable determines the power output, with which the electric motor 2 is to be activated.

The activation of the triac 4 ideally occurs in a period of time dependent on the control variable S after the zero crossing of the motor current so that the motor current stays conductive only from an ignition time point (predetermined time after the zero crossing of the motor current) up until the renewed achieving (approximately) of the zero crossing of the motor current. The power output provided to the electric motor 2 is thereby reduced to a percentage of the maximum power output (which would be possible without phase angle control).

A difficulty occurs in precisely determining the time of the zero crossing of the motor current because the course of the motor current is normally not acquired. The temporal position of the zero crossing can also not immediately be determined during a phase angle control in each half-wave.

The AC voltage $U_W$ applied to the electric motor is provided to the control unit 3. Due to the load dependent, variable phase shift between the AC voltage $U_W$ applied to the series connection of said electric motor 2 and the triac 4 and the motor current flowing through said electric motor 2, the zero crossings of the motor current 1 cannot be precisely detected. The existing method of specifying a predefined minimum period of time starting from the time of the zero crossing of the voltage applied to the electric motor 2 has, however, the disadvantage of being oriented to the largest possible phase shift between the motor current and the applied voltage and therefore of not being optimal for other operating states, wherein said phase shift is smaller.

For that reason it is proposed that the voltage potential be tapped at a node K between the triac 4 and the electric motor 2 and the control unit 3 be provided with a detection unit 10 in order to detect the times of the zero crossings of the motor current. A voltage drop of approximately 2 V normally occurs across a conductive triac 4. When current is blocked to said triac 4, it is highly resistive so that the complete AC voltage is present across the same. For that reason, a control device 11 of the control unit 3 can ascertain the switching times of the triac 4 by voltage jumps being detected across said triac 4 by monitoring the voltage between the second AC voltage line 6 and the node K. This occurs by means of the detection unit 10. That means that the voltage jumps, which occur when said triac 4 is ignited, i.e. when it connects through, as well as the voltage jumps, which occur when said triac is turned off, are detected. Because the igniting of said triac 4 is triggered by the control device 11, those voltage jumps at the switching times, at which said triac deactivates, can be determined by said control device 11 by not taking into account the voltage jumps, which occur when turning on said triac 4. The voltage jumps upon turning on said triac 4 are recognized because they occur at the same time as the ignition signal.

The voltage jump, which results from turning off the triac 4, can now be used to ascertain the time, at which said triac 4 can again be ignited. The time when said triac 4 was turned off can now be assumed to be approximately the zero crossing of the motor current. As an alternative, the time of the zero crossing of the motor current can be ascertained as a function of the corresponding holding current of said triac 4, the frequency of the AC voltage and other variables. The time, at which a reigniting of said triac 4 is again possible, is ascertained by adding a dead time to said time of the zero crossing of the motor current, which indicates how long it takes for said motor current to correspond to a current value that is greater than the corresponding holding current of said triac 4.

The control unit 3 can, for example, be implemented as a microcontroller, which has the ability to evaluate the courses of the AC voltages and particularly has the ability to evaluate the voltage difference between the voltage at the node K and the voltage of the second AC voltage line 6 such that the times of the voltage jumps due to a switching of the triac 4 can be recognized.

Figure 2:
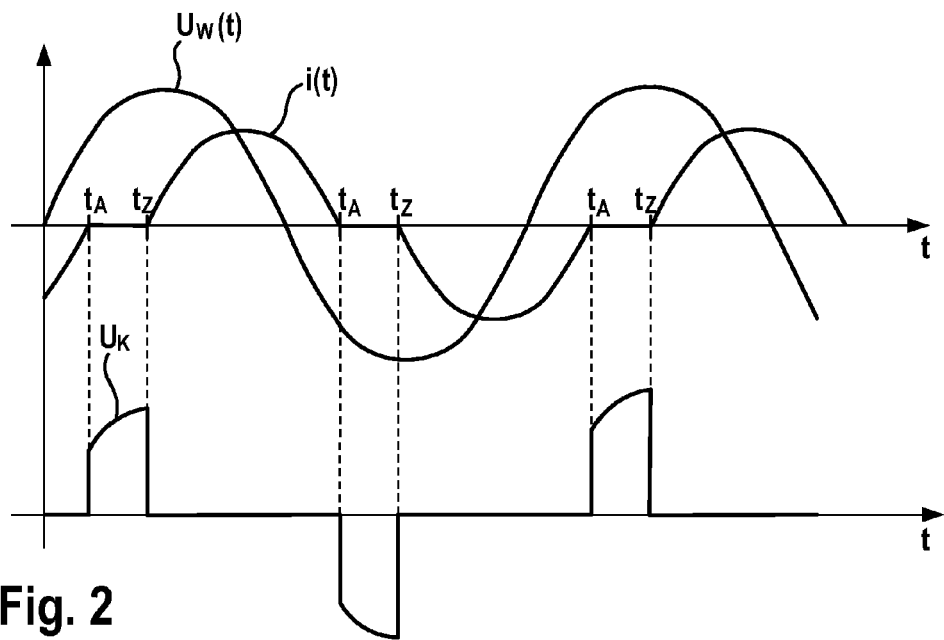
FIG. 2: a signal-time diagram for illustrating the method for determining the earliest ignition time point in the motor system of FIG. 1.

Signal-time diagrams are depicted in FIG. 2, which indicate the AC voltage $U_W$ applied to the electric motor 2, the lagging motor current i and the voltage $U_K$ between the second AC voltage line and the node K. The voltage jumps at the ignition time point $t_z$ and at the deactivation time $t_4$, which can be recognized by the control unit 3, can be seen in FIG. 2.

Adaptation to the earliest possible ignition time point has the advantage in that the service life of the brushes is considerably increased because electrical arcing is reduced on account of the lower harmonic content. The EMI emissions are likewise reduced. As a result, the self-heating of the electric motor is also less.

The invention claimed is:

1. Method for operating an electric motor having a phase angle control with the following steps:
    applying an AC voltage to a series connection of the electric motor and a switching element comprising a triac, wherein said switching element connects through by applying an ignition signal and suppresses the flow of a current if the amount of current falls below a holding current;
    determining a time of a virtual zero crossing of a motor current that would flow if said switching element were connected through by:
        detecting a voltage jump across the switching element; and
        comparing the timing of the voltage jump to the timing of an ignition signal, wherein a first voltage jump that occurs at or near the timing of the ignition signal signifies a turning on of the switching element, and a second voltage jump signifying a turning off of the switching element approximates the virtual zero crossing of the motor current; and;
    turning on said switching element at an activation time that is dependent on the time of the virtual zero crossing of the motor current.

2. Method according to claim 1, wherein the switching element is turned on at a time, which is dependent on a provided control variable that indicates the desired power output of the electric motor.

3. Method according to claim 1, wherein determining of the time of the virtual zero crossing of a motor current is carried out as a function of the time when the switching element is turned off.

4. Method according to claim 3, wherein the time when the switching element is turned off is determined as the time, at which a voltage jump of the voltage present across said switching element occurs.

5. Method according to claim 4, wherein the times when the voltage jump of the voltage present across the switching element occur are determined as the times when said voltage jump occurs, at which said switching element is not turned on.

6. Method according to claim 4, wherein the activation time is determined by adding a length of time to the time of the voltage jump, the length of time being defined or being selected as a function of the frequency of the applied AC voltage and/or the holding current of the switching element.

7. Motor control unit for operating an electric motor having a phase angle control, with which an AC voltage is applied to a series connection of said electric motor and a switching element comprising a triac, with which said switching element connects through by applying an ignition signal and suppresses the flow of a current if the amount of current falls below a holding current; comprising:
    a detection unit for determining a time of a virtual zero crossing of a motor current, which would flow if said switching element were connected through by:
        detecting a voltage jump across the switching element; and
        comparing the timing of the voltage jump to the timing of an ignition signal, wherein a first voltage jump that occurs at or near the timing of the ignition signal signifies a turning on of the switching element, and a second voltage jump signifying a turning off of the switching element approximates the virtual zero crossing of the motor current; and
    a control device for turning on said switching element at a time that is dependent on the time of the virtual zero crossing of the motor current.

8. Motor system having a motor control unit according to claim 7, an electric motor and a switching element, wherein said electric motor and said switching element are connected to each other in series.

9. Computer program that contains a program code, which executes a method according to claim 1 on a data processing unit.

* * * * *

UNITED STATES PATENT AND TRADEMARK OFFICE
CERTIFICATE OF CORRECTION

PATENT NO. : 8,487,570 B2  
APPLICATION NO. : 12/808047  
DATED : July 16, 2013  
INVENTOR(S) : Walter et al.

Page 1 of 1

It is certified that error appears in the above-identified patent and that said Letters Patent is hereby corrected as shown below:

On the Title page, Item (30) Foreign Application Priority Data: "Dec. 14, 2007  DE  10 2004 060 242" should read --Dec. 14, 2007  DE  10 2007 060 242--

Signed and Sealed this  
Thirty-first Day of December, 2013

Margaret A. Focarino  
*Commissioner for Patents of the United States Patent and Trademark Office*